(12) United States Patent
Patel

(10) Patent No.: US 9,266,478 B2
(45) Date of Patent: Feb. 23, 2016

(54) CONVERTIBLE MOUNTING BRACKET

(71) Applicant: Thule Sweden AB, Hillerstorp (SE)

(72) Inventor: Ash Patel, Newton, CT (US)

(73) Assignee: Thule Sweden AB, Hillerstorp (SE)

(*) Notice: Subject to any disclaimer, the term of this patent is extended or adjusted under 35 U.S.C. 154(b) by 51 days.

(21) Appl. No.: 14/285,087

(22) Filed: May 22, 2014

(65) Prior Publication Data

US 2015/0028072 A1 Jan. 29, 2015

Related U.S. Application Data

(60) Provisional application No. 61/859,163, filed on Jul. 26, 2013.

(51) Int. Cl.
*B60R 9/045* (2006.01)
*B60R 9/058* (2006.01)
*B60R 9/08* (2006.01)
*F16B 2/06* (2006.01)
*F16B 2/10* (2006.01)

(52) U.S. Cl.
CPC .............. *B60R 9/058* (2013.01); *B60R 9/045* (2013.01); *B60R 9/08* (2013.01); *F16B 2/065* (2013.01); *F16B 2/10* (2013.01); *Y10T 24/44564* (2015.01)

(58) Field of Classification Search
CPC ..... F16B 2/065; F16B 2/10; Y10T 24/44564; B60R 9/045; B60R 9/058
USPC ......... 224/309, 310, 321, 324, 319, 325, 328, 224/558; 24/514
See application file for complete search history.

(56) References Cited

U.S. PATENT DOCUMENTS

| 2,547,932 | A | * | 4/1951 | Downs, Jr. | ............... H01R 4/38 24/569 |
| 2,890,848 | A | * | 6/1959 | Johnson, Jr. | ......... B23Q 3/1546 248/206.5 |
| 3,203,421 | A | * | 8/1965 | Bialick | ................. A61F 2/0054 128/885 |
| 4,824,066 | A | * | 4/1989 | Smith | ....................... A61F 2/14 24/514 |
| 5,419,479 | A | | 5/1995 | Evels et al. | |

(Continued)

FOREIGN PATENT DOCUMENTS

WO 2010144369 12/2010

OTHER PUBLICATIONS

Compare Replacement Load vs. Load Stops for etrailer.com; http://www.etrailer.com/comparison.aspx?pc=853-7289&pc2=753-3761 on Jul. 15, 2013.

*Primary Examiner* — Justin Larson
(74) *Attorney, Agent, or Firm* — Sterne, Kessler, Goldstein & Fox P.L.L.C.

(57) ABSTRACT

A convertible mounting bracket (100) capable of securement onto load carrier bars (200, 202) of different dimensions is presented. The bracket (100) can include an elongate first jaw body (102), elongate second jaw body (110), and a flip-connector (130). The flip-connector (130) can be interconnected to a first end (112) of the second jaw body (110) by a pivot connection (140). In a first orientation (152) of the second jaw body (110), a first (120) of at least two load bar engaging surfaces (121, 123) of the second jaw body (110) is facing a load bar engaging surface (108) of the first jaw body (102). In a second orientation (154) of the second jaw body (110), a second (122) of the at least two load bar engaging surfaces (121, 123) of the second jaw body (110) is facing the load bar engaging surface (108) of the first jaw body (102).

30 Claims, 12 Drawing Sheets

(56) References Cited

U.S. PATENT DOCUMENTS

| | | | |
|---|---|---|---|
| 5,611,654 A | 3/1997 | Frattarola et al. | |
| 5,657,914 A | 8/1997 | Stapleton | |
| 5,695,164 A * | 12/1997 | Hartmann | B60R 11/00 248/206.4 |
| 5,769,292 A | 6/1998 | Cucheran et al. | |
| 6,131,576 A * | 10/2000 | Davis | A61B 17/122 128/885 |
| 6,283,425 B1 * | 9/2001 | Liljevik | F16M 13/02 248/218.4 |
| 6,296,161 B1 * | 10/2001 | Van der Feen | B60R 9/055 224/319 |
| 6,419,253 B1 | 7/2002 | Mascari | |
| 6,422,441 B1 * | 7/2002 | Settelmayer | B60R 9/048 224/324 |
| 6,568,644 B2 | 5/2003 | Pedersen | |
| 6,681,971 B2 | 1/2004 | Laverack et al. | |
| 6,766,929 B2 * | 7/2004 | Karlsson | B60R 9/045 224/315 |
| 6,793,186 B2 | 9/2004 | Pedersen | |
| 7,137,611 B2 * | 11/2006 | Aulicino | A61M 39/284 251/9 |
| 7,234,617 B2 | 6/2007 | Weaver et al. | |
| 7,357,283 B2 | 4/2008 | Settelmayer | |
| 7,367,481 B2 | 5/2008 | Barbara | |
| 7,658,195 B2 * | 2/2010 | Dennis | A61F 2/0054 128/885 |
| 8,167,180 B2 * | 5/2012 | Bogoslofski | B60R 9/08 224/321 |
| 8,167,259 B2 | 5/2012 | Spang et al. | |
| 8,177,187 B2 * | 5/2012 | Feast | F16K 7/061 251/7 |
| 8,210,407 B2 * | 7/2012 | Sautter | B60R 9/048 224/315 |
| 8,297,570 B2 | 10/2012 | Noyes | |
| 8,317,526 B2 * | 11/2012 | Gardner | H01R 4/36 24/489 |
| 8,356,797 B1 | 1/2013 | Searer et al. | |
| 8,393,506 B2 | 3/2013 | Malm | |
| 8,393,508 B2 * | 3/2013 | Sautter | B60R 9/055 224/321 |
| 8,733,604 B2 * | 5/2014 | Murray | B60R 9/042 224/310 |
| 8,757,457 B2 * | 6/2014 | Settelmayer | B60R 9/055 224/309 |
| 8,864,504 B1 * | 10/2014 | Gretz | H01R 4/66 439/100 |
| D718,217 S * | 11/2014 | Detweiler | D12/414 |
| D727,245 S * | 4/2015 | Patel | D12/414 |
| 2002/0125282 A1 * | 9/2002 | Laverack | B60R 9/045 224/319 |
| 2003/0000978 A1 * | 1/2003 | Aki | B60R 9/045 224/319 |
| 2004/0255436 A1 * | 12/2004 | Fujii | A61J 1/2093 24/521 |
| 2006/0249466 A1 * | 11/2006 | Wang | B62H 3/02 211/17 |
| 2006/0289577 A1 | 12/2006 | Malone | |
| 2008/0000940 A1 * | 1/2008 | Wang | B60R 9/10 224/319 |
| 2008/0029563 A1 * | 2/2008 | Malone | B60R 9/00 224/319 |
| 2008/0121672 A1 | 5/2008 | Ripaldi et al. | |
| 2010/0229355 A1 * | 9/2010 | Wang | F16B 2/10 24/489 |
| 2010/0327033 A1 | 12/2010 | Payne | |
| 2011/0139841 A1 | 6/2011 | Sautter et al. | |
| 2011/0290836 A1 * | 12/2011 | Shen | B60R 9/045 224/319 |
| 2012/0145757 A1 * | 6/2012 | Settelmayer | B60R 9/058 224/309 |
| 2012/0181313 A1 * | 7/2012 | Sautter | B60R 9/08 224/310 |
| 2012/0234881 A1 * | 9/2012 | Sautter | B60R 9/08 224/321 |
| 2012/0261449 A1 * | 10/2012 | Jeli | B60R 9/12 224/323 |
| 2013/0020361 A1 * | 1/2013 | Sautter | B60R 9/048 224/315 |
| 2014/0097219 A1 * | 4/2014 | Reiber | B60R 9/055 224/310 |
| 2014/0252056 A1 * | 9/2014 | Murray | B60R 9/042 224/310 |
| 2015/0028072 A1 * | 1/2015 | Patel | B60R 9/045 224/319 |
| 2015/0191127 A1 * | 7/2015 | Sautter | B60R 9/08 224/331 |

\* cited by examiner

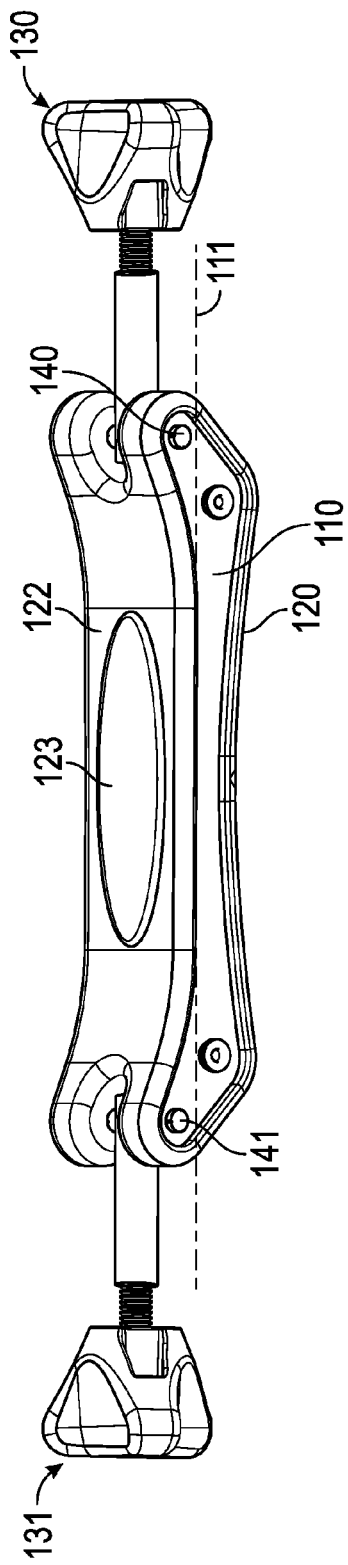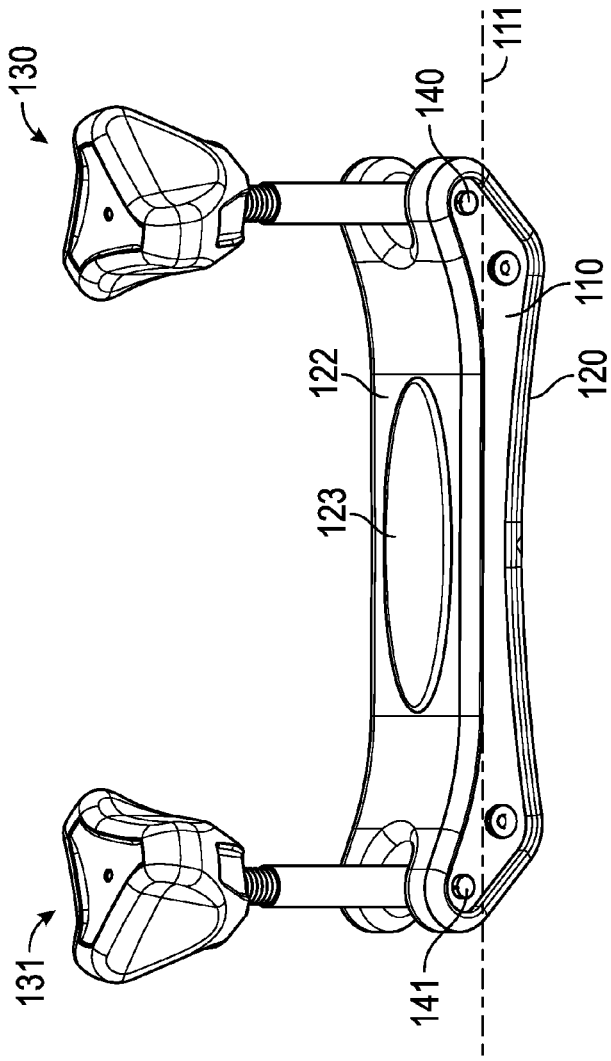
FIG. 13B
FIG. 13C

CONVERTIBLE MOUNTING BRACKET

CROSS-REFERENCE TO RELATED APPLICATION

This application claims priority to U.S. Provisional Application No. 61/859,163, filed Jul. 26, 2013, the contents of which are entirely incorporated by reference herein.

FIELD

The present disclosure relates generally to a convertible mounting bracket. More specifically, embodiments within this disclosure relate to a mechanism configured to clamp a vehicular mounted load bar.

BACKGROUND

Safely and conveniently transporting sports equipment is a concern for many sports enthusiasts. For example, canoes, kayaks, and bicycles can be carried on the roof of a car via one or more load bars that are mounted horizontally to the direction of travel. Typically, a clamping device is configured to be coupled to a particular type or size of load bar.

BRIEF DESCRIPTION OF THE DRAWINGS

Implementations of the present application will now be described, by way of example only, with reference to the attached figures, wherein:

FIG. 13B is another perspective view of a second jaw of an exemplary convertible mounting bracket in which a second load bar engaging surface is seen and flip-connectors are in a second position in an example embodiment;

FIG. 13C is another perspective view of a second jaw of an exemplary convertible mounting bracket in which a second load bar engaging surface is seen and flip-connectors are in a third position in an example embodiment;

DETAILED DESCRIPTION

Figure 1:
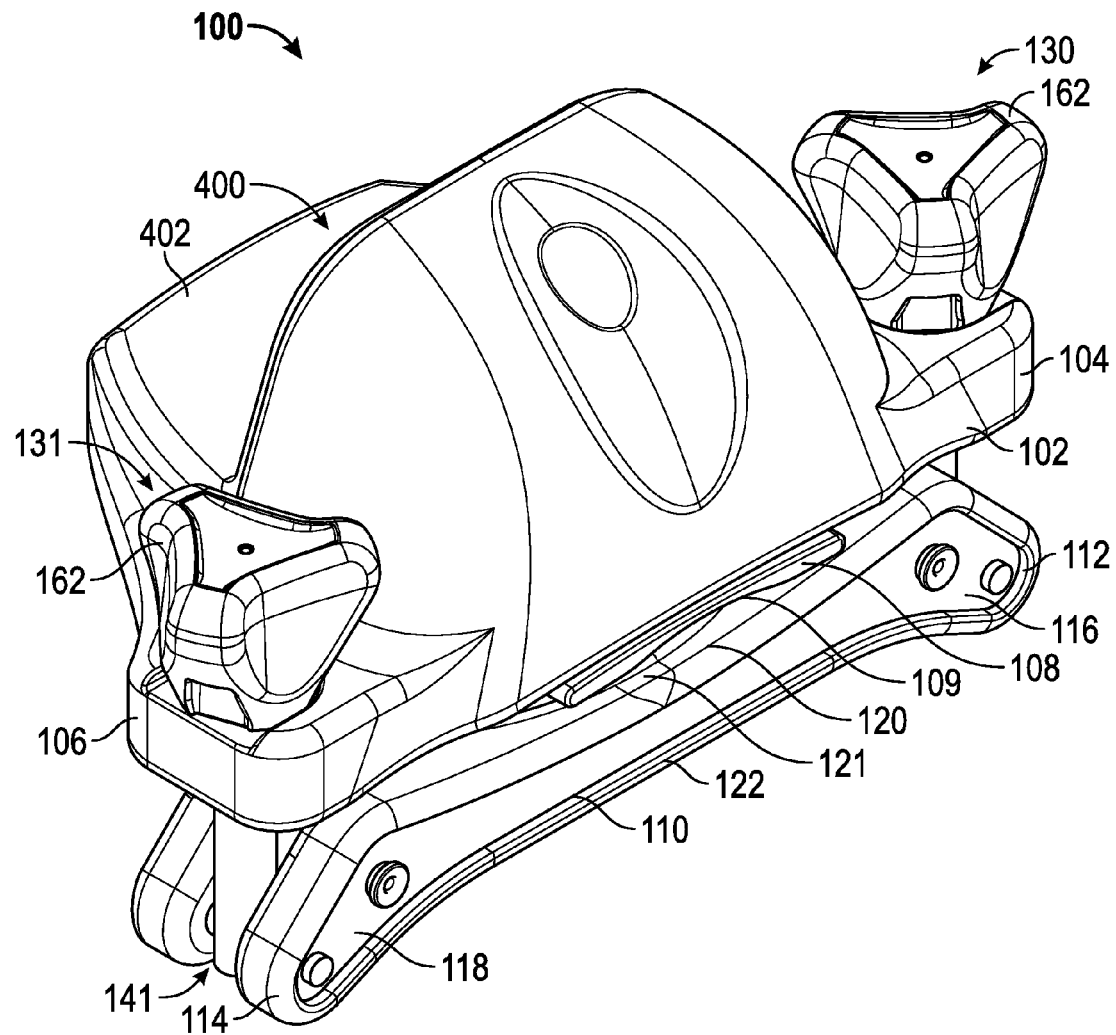
FIG. 1 is an exemplary perspective view of a convertible mounting bracket in accordance with an example embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. The description is not to be considered as limiting the scope of the implementations described herein. Descriptions and characteristics of embodiments within this disclosure not mutually exclusive.

The present technology can be implemented as a convertible mounting bracket. The convertible mounting bracket is configured to be coupled to a load bar on a vehicle. The load bar can be coupled to the vehicle via feet that are coupled to either a vehicle bar or the vehicle itself. The load bar can be horizontal relative to direction of travel of a vehicle. The convertible mounting bracket can be implemented as a sporting equipment carrier or can be implemented as a mounting bracket for a sporting equipment load carrier. For example, the convertible mounting bracket can include an extension portion which can be used to support the gunwale of a canoe, kayak or other watercraft in an inverted configuration. In other embodiments, the convertible mounting bracket can be included as part of a bike mounting mechanism, a kayak carrier or other support equipment load carrier.

The present technology can include one or more of the features described herein. While some features are described in relation to a particular figure, the features can be implemented with other embodiments.

A convertible mounting bracket can be capable of securement onto load carrier bars of different dimensions. The convertible mounting bracket can include an elongate first jaw body having a first end opposite a second end. The first jaw body can have a load bar engaging surface. The convertible mounting bracket can also include an elongate second jaw body having a first end opposite a second end. The second jaw body can have at least two load bar engaging surfaces on opposite sides of the second jaw body. The convertible mounting bracket can also include a flip-connector coupled between the first ends of each of the first and second jaw bodies. The flip-connector can be interconnected to the first end of the second jaw body by a pivot connection. In one or more implementations, the pivot connection can accommodate approximately 180 degree pivotation of the second jaw body about the pivot connection between first and second orientations of the second jaw body. In the first orientation of the second jaw body, a first of the at least two load bar engaging surfaces of the second jaw body is facing the load bar engaging surface of the first jaw body. In the second orientation of the second jaw body, a second of the at least two load bar engaging surfaces of the second jaw body is facing the load bar engaging surface of the first jaw body and thereby enabling securement of the convertible mounting bracket onto load carrier bars of different dimensions.

The first engaging surface of the second jaw body can be closer in distance to the load bar engaging surface of the first jaw body in the first orientation than the second engaging surface in the second orientation when the connector is the same length in each orientation. The first and second engaging surfaces of the second jaw body can each be concave into the second jaw body. The second jaw body can have at least one lobe extending obliquely away from a long axis of the second jaw body. The at least one lobe can comprise the pivot connection between the connector and the second jaw body.

The first jaw body can contain a slot into the first end for laterally receiving the connector therein.

A second connector can be coupled between the second ends of each of the first and second jaw bodies. The second connector can be connected by a pivot connection to the second end of the second jaw body. During transition from the first orientation to the second orientation, one of the connectors can remain connected to the first and second jaw bodies. The connector can include a graspable knob attached to an end of the connector that is coupled to the first jaw body. Rotation of the knob can reduce an effective length of the flip-connector. The connector and/or second connector can include an elongate shaft. A length of the connector and/or second connector can be adjustable. The connector and/or second connector can include a pair of telescoping members that upon actuation vary the length of the connector and/or second connector. The telescoping members of the connector and/or second connector can include a male member which is configured to be threaded into a female member. The length of the connector and/or second connector can be adjustable such that a first distance between the first load bar engaging surface of the second jaw body and the load bar engaging surface of the first jaw body is adjustable over a first distance range, and the length of the connector and/or second connector can be adjustable such that a second distance between the second load bar engaging surface of the second jaw body and the load bar engaging surface of the first jaw body is adjustable over a second distance range. The first and second distance ranges are different and the first distance range overlaps with the second distance range. A maximum adjustable distance of the first load bar engaging surface of the second jaw body from the load bar engaging surface of the first jaw body can be greater than a maximum adjustable distance of the second load bar engaging surface of the second jaw body from the load bar engaging surface of the first jaw body.

The elongate first jaw body can be fixedly attached to a load carrier. The elongate first jaw body is formed as an integral portion of a load carrier. An engagement member can be configured to be positioned upon at least one of the load bar facing portions of the second jaw body, wherein the engagement member has an exposed surface adapted to engage a load carrier bar in an installed configuration of the convertible mounting bracket on a load carrier bar. In another example, a plurality of exchangeable engagement members can be included, and each engagement member can be configured to be positioned upon at least one of the load bar facing portions of the second jaw body, wherein different engagement members are adapted to engage differently dimensioned load carrier bars.

The present disclosure includes a sporting equipment load carrier having a mounting bracket. The mounting bracket can be as described above. For example, the mounting bracket can include a first jaw body and a second jaw body for receiving a vehicular mounted load carrier bar therebetween, wherein a surface of one of the first or second jaw bodies is adapted to abuttingly engage the load carrier bar. The mounting bracket can further include an elongate fastener or connector attachable between the first and second jaw bodies. The fastener can include a male portion and a female portion. The male portion can be insertable at variable lengths into the female portion. The fastener can include a graspable knob attached to an end of the fastener that is coupled to the first jaw body. Rotation of the knob can reduce the effective length of the fastener. The knob can have a smooth outer surface. One of the first or second jaw bodies can include a slot to receive the male portion of the fastener and a top surface for abutment of the knob thereon when the male portion is received in the slot. The male portion can be threadably insertable into the female portion. The female portion can be hollowed along a portion of its length, the hollowed portion configured to receive the male portion. The female portion can be pivotably attached to the bracket.

An example of a convertible mounting bracket is described in relation to FIGS. 1-15. Another example of a convertible mounting bracket is presented in FIG. 16, wherein the convertible mounting bracket is included with an expandable kayak carrier. These embodiments and examples are not limiting in scope and the convertible mounting bracket can be implemented to secure sporting equipment, cargo boxes, or other items configured to be secured to a load bar.

FIG. 1 is an exemplary perspective view of a convertible mounting bracket in accordance with an example embodiment. As illustrated, the convertible mounting bracket 100 includes an elongate first jaw body 102 having a first end 104 opposite a second end 106. The first jaw body 102 can have a load bar facing portion 108, which can include a load bar engaging surface 109. The load bar engaging surface 109 can be integrally molded with the load bar facing portion 108. In other embodiments, the load bar engaging surface 109 can be coupled to the load bar facing surface 108. In at least one embodiment, the load bar engaging surface 109 can be removably coupled to the load bar facing surface 108.

The convertible mounting bracket 100 can include an elongate second jaw body 110 having a first end 112 opposite a second end 114. The second jaw body 110 can have at least two load bar facing portions 120, 122 on opposite sides of the second jaw body 110. In at least one embodiment, the load bar facing portions 120, 122 can include respective load bar engaging surfaces 121, 123.

The convertible mounting bracket 100 can include a connector 130 coupled between the first end 104 of the first jaw body 102 and a first end 112 of the second jaw body 110. The connector can include an elongate shaft. As described below, the elongate shaft can include a male portion and a female portion. The length of the connector can be adjustable as well. The connector 130 can be interconnected to the first end 112 of the second jaw body 110 by a pivot connection 140. In at least one embodiment, the connector 130 can be in the form of a flip-connector. As illustrated in FIGS. 5-10, the pivot connection 140 can accommodate approximately 180 degree pivotation of the second jaw body 110 about the pivot connection 140 between a first orientation and a second orientation of the second jaw body 110. In the first orientation of the second jaw body 110, a first load bar engaging surface 121 of the at least two load bar engaging surfaces 121, 123 of the second jaw body 110 can face the load bar engaging surface 109 of the first jaw body 102. In the second orientation of the second jaw body 110, a second 122 of the at least two load bar engaging surfaces 121, 123 of the second jaw body 110 can face the load bar engaging surface 109 of the first jaw body 102 and thereby accommodating securement of the convertible mounting bracket 100 onto load carrier bars of different dimensions.

The first jaw body 102 can be configured to engage a load such as sports equipment or other cargo, or a portion thereof. For example, as illustrated the first jaw body 102 includes a sports equipment engagement portion 400. The sports equipment engagement portion 400 can include a first portion 402. The first portion 402 can support sporting equipment such as a canoe or a kayak.

Figure 2:
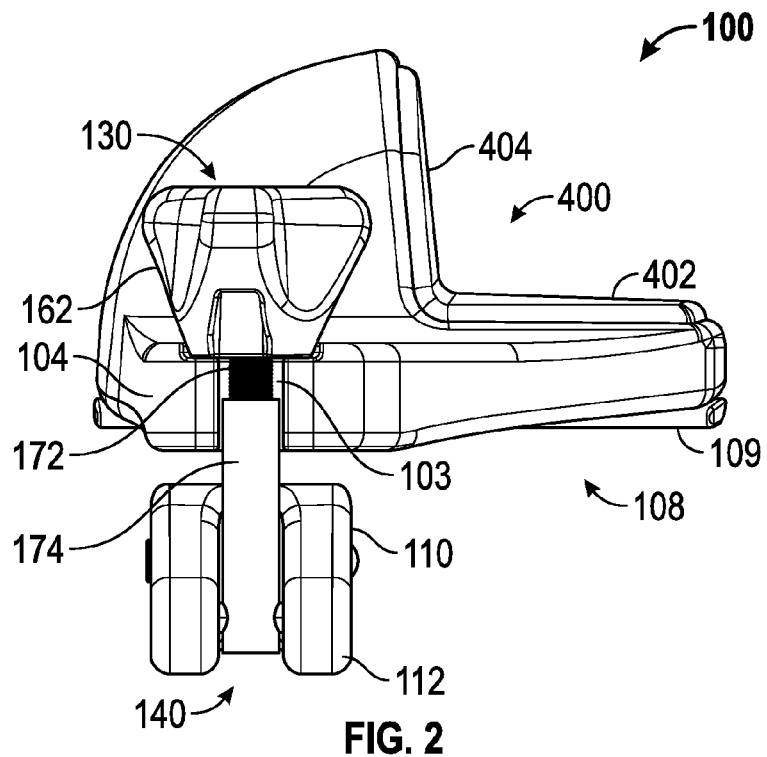
FIG. 2 is an exemplary first side elevation view of the convertible mounting bracket of FIG. 1.

FIG. 2 is an exemplary first side elevation view of the convertible mounting bracket 100. The first end 104 of the first jaw body 102 is illustrated. The first end 104 of the first jaw body 102 has a slot 103 formed therein. The slot 103 allows the connector 130 to rotate relative the first jaw body 102 such that the connector is 130 is not coupled to the first jaw body 102 but remains coupled to the second jaw body 110 during rotation. As illustrated, the load bar facing portion 108 of the first jaw body 102 includes a load bar engaging surface 109. The load bar engaging surface 109 can be a different material as compared with the material of the load bar facing portion 108. In at least one embodiment, the load bar facing portion 108 can be integrally molded with the first jaw body 102.

The connector 130 can include an elongate shaft which, in at least one implementation, includes a male portion 172 and a female portion 174. The female portion 174 can include a hollow portion configured to receive the male portion. The male portion 172 can be at least partially threaded. In other embodiments, the male portion can be completely threaded. When the male portion 172 is threaded at least a portion of the female portion 174 can be threaded. In at least one embodiment, the female portion 174 can be completely threaded. In another embodiment, the female portion 174 can be threaded until it reaches a predetermined length. The female portion can have a hole formed cross-wise to the hollow portion of the female portion 174. The hole formed cross-wise can be configured to receive a pin that couples the female portion 174 to the second jaw portion 110. The pin allows the female portion 174 to rotate relative to the second jaw body 110. In other embodiments, other coupling connections can be implemented to allow the female portion to rotate relative to the second jaw body 110.

While the illustrated embodiment includes a threaded male portion 172 and a threaded female portion 174, other embodiments can implement other male portions 172 and other female portions. For example, the male portion 172 can be coupled to the female portion by a pin connection. In other implementations, the connector 130 can include other types of coupling devices such that a portion of the connector 130 can be removable coupled to the second jaw body 110.

As noted with regard to FIG. 1, the first jaw body 102 can be configured to engage a load such as sports equipment or other cargo. For example, as illustrated in FIG. 2, the first jaw body 102 has a sports equipment engagement portion 400. The sports equipment engagement portion 400 can include a first portion 402 and a second portion 404. The first portion 402 can be substantially parallel with the load bar facing portion 108. The first portion 402 can be substantially flat. In other embodiments, the first portion 402 can have a slope, angle or curvature. The first portion 402 can include a pad that is configured to receive a portion of a sports equipment load. As illustrated, the first portion 402 is configured to receive a gunwale of a canoe or kayak. The second portion 404 can be formed such that it forms a substantially right angle, or slightly more than a right angle, with the first portion 402. The second portion 404 provides for a barrier against lateral movement of the sports equipment on the first portion 402.

Figure 3:
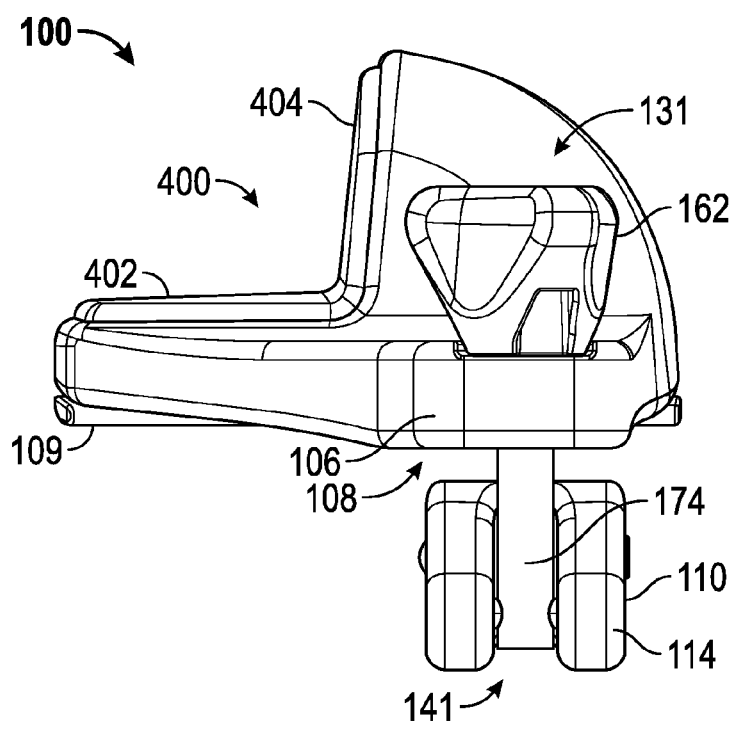
FIG. 3 is an exemplary second side elevation view of the convertible mounting bracket of FIG. 1.

FIG. 3 is an exemplary second side elevation view of the convertible mounting bracket 100. As illustrated, the second side elevation view of the convertible mounting bracket 100 is substantially a mirror image of the first side elevation view, except that the second end 106 does not have a slot formed therein. When the second end 106 does not have a slot formed therein, the second end 106 serves to capture a second connector 131. The second connector 131 can be in the form of a flip-connector. When the second connector 131 is in the form of a flip-connector, the second connector 131 allows for the second jaw body 110 to be rotated with respect to the first jaw body 102 while the second jaw body 110 remains coupled to the first jaw body by the second connector 131, even when the first connector 130 is disengaged and rotated with respect to the first jaw body 102 and second jaw body 110. The second connector 131 can be configured like the first connector described above in relation to FIG. 2. The first connector 130 and second connectors 131 will be further described below.

Figure 4A:
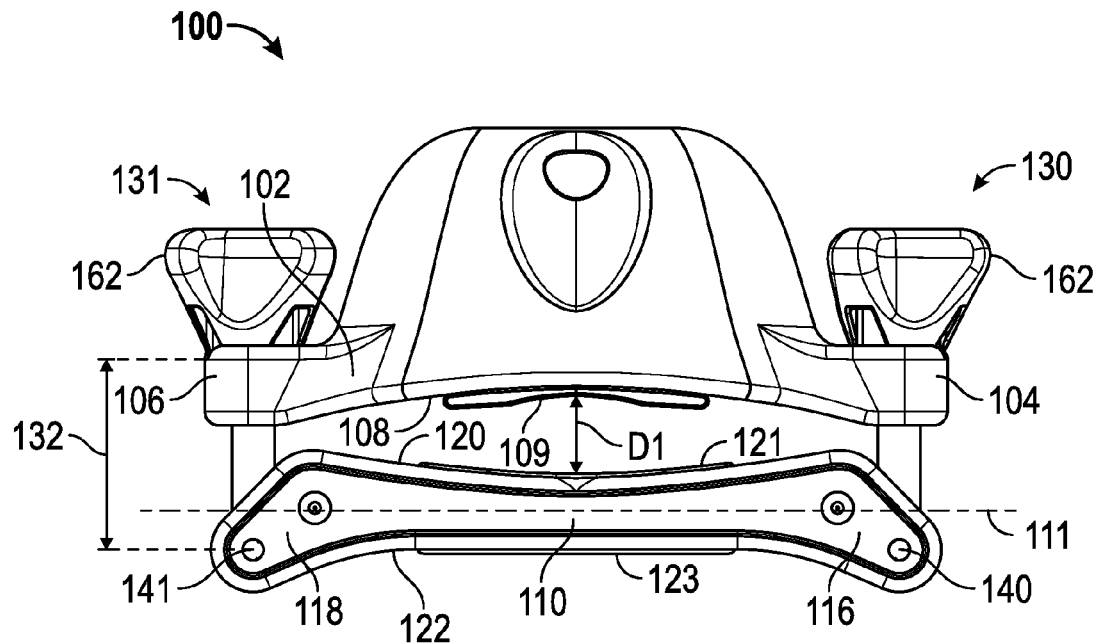
FIGS. 4A-D are exemplary third side elevation views of the convertible mounting bracket of FIG. 1.
Figure 4B:
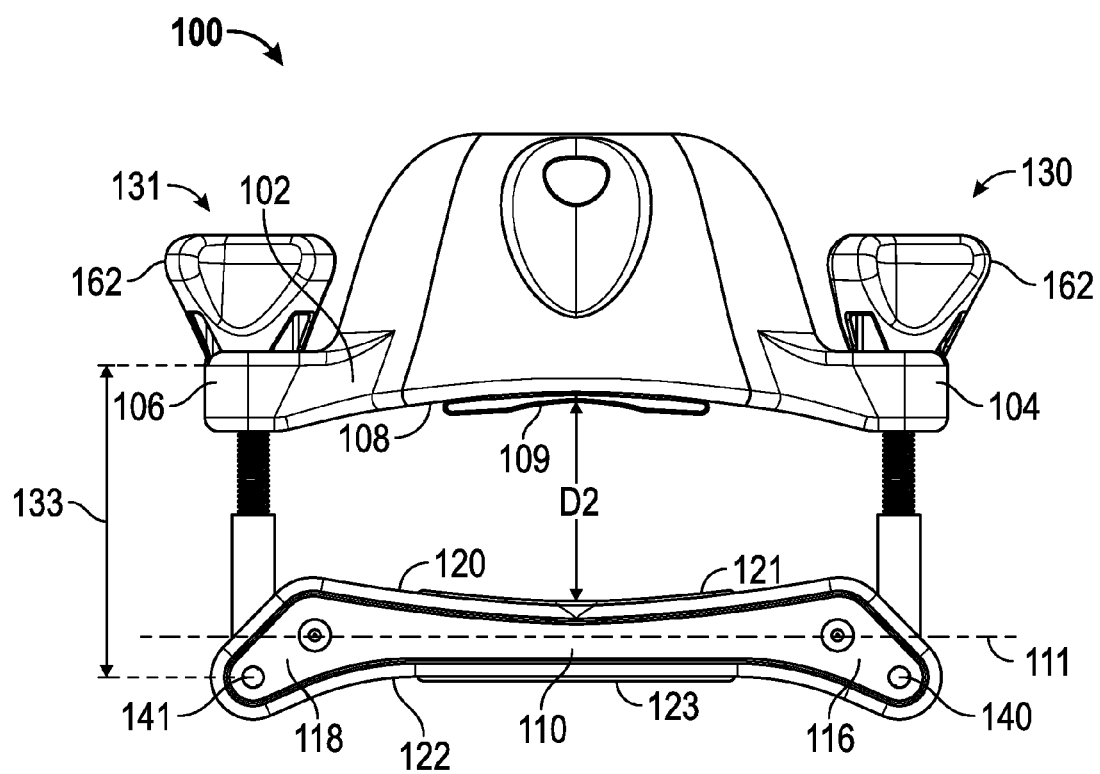

FIGS. 4A-D illustrate exemplary third side elevation views of the convertible mounting bracket of FIG. 1. These views illustrate a minimum and maximum configuration of the first jaw body 102 relative to the second jaw body 110 in a first orientation 152 and a second orientation 154. FIGS. 4A-B illustrate the convertible mounting bracket 100 in a first orientation 152. In the first orientation 152 of the second jaw body 110, a first of the at least two load bar engaging surfaces 121, 123 of the second jaw body 110 faces the load bar engaging surface 109 of the first jaw body 102.

In FIG. 4A, a minimum first configuration is illustrated. A distance can be formed between the first jaw body 102 and the second jaw body 110. A distance D1 separates a load bar facing portion 108 of the first jaw body 102 from a first load bar facing portion 120 of the second jaw body 110. The load bar facing portion 108 of the first jaw body 102 can have a load bar engaging surface 109 as described above. In at least one embodiment, the load bar facing portion 108 can have a concave shape. In at least one embodiment, the load bar engaging surface 109 can have a concave shape. Other shapes for the load bar engaging surfaces are possible within this disclosure.

The second jaw body 110 can have first load bar facing portion 120 that has a concave shape. The first load bar facing portion 120 can include a second load bar engaging surface 121 that can have a concave shape. Other shapes for portions 120 and 121 are possible.

The second jaw body 110 can have at least one lobe 116, 118 which extends obliquely away from a long axis 111 of the second jaw body 110. The at least one lobe 116, 118 can include a pivot connection 140, 141 between the respective connector 130, 131 and the second jaw body 110. The connectors 130, 131 can include knob 162 which can be in the form of a graspable knob. In at least one embodiment, the knob can have a smooth outer surface. The knob 162 can be coupled to an end of the connector 130 that can be coupled to first jaw body 102. In the illustrated example, the knob 162 is coupled to a male portion 172. When the knob 162 is rotated, the length of the respective connector 130, 131 can be lengthened. When the connectors 130, 131 are in their shortened configuration, the connectors can have a length 132. Other lengths are possible. As the knob 162 is rotated, the length can be increased until the connectors 130, 131 reach a maximum length 133 as illustrated in FIG. 4B. While in the illustrated example of FIG. 4A has the first jaw body 102 separated from the second jaw body 110 such that no portion of the second jaw body 110 touches the first jaw body 102, other configurations can include a minimum position in which the first jaw body 102 and the second jaw body touch.

In a maximum configuration as illustrated in FIG. 4B, the connectors 130, 131 can have a maximum length 133. Other maximum lengths are possible. When the connectors are in their maximum length configuration and the second jaw 110 is in its first configuration, the maximum distance between the load facing portion 108 of the first jaw body 102 and the first load facing portion 120 of the second jaw body 110 is a distance D2.

Figure 4C:
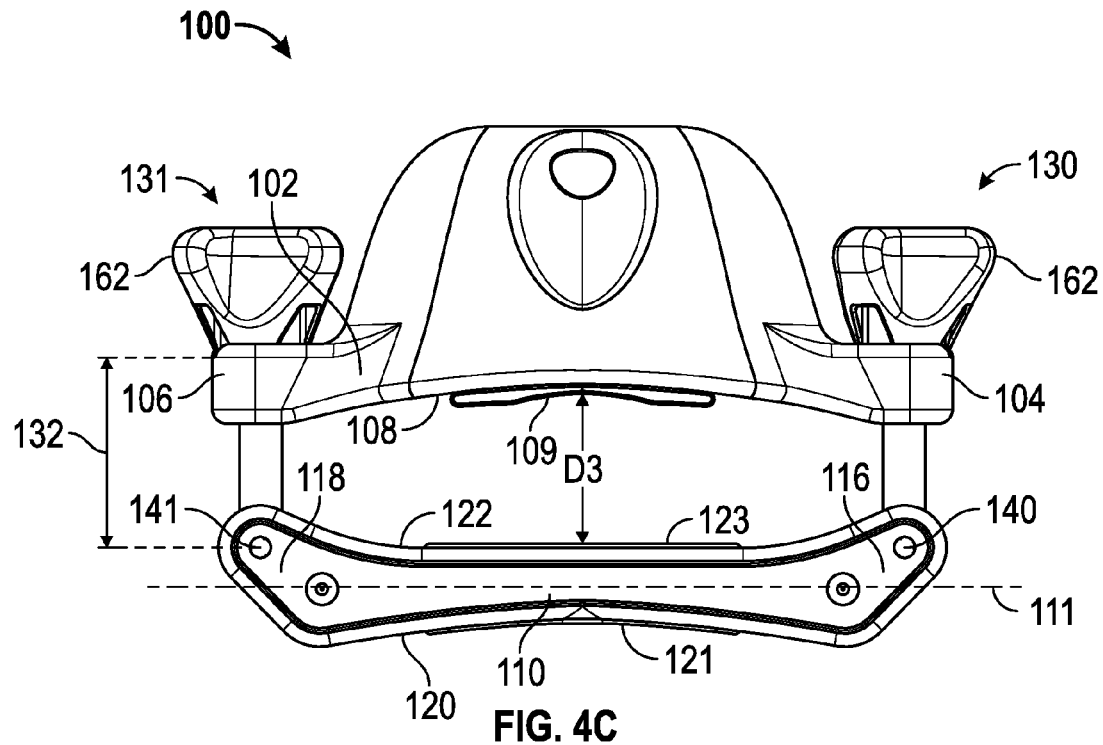
Figure 4D:
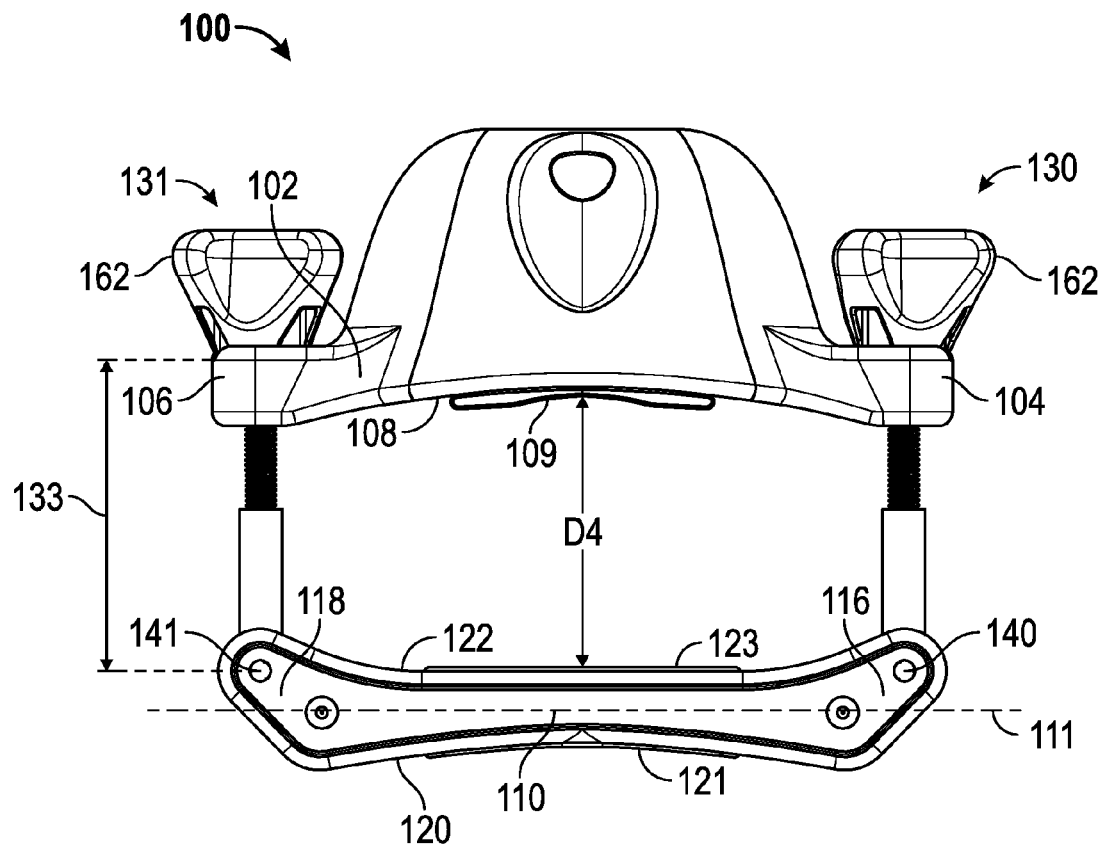

FIGS. 4C-D illustrate the convertible mounting bracket 100 in a second orientation 154. In the second orientation 154 of the second jaw body 110, a second of the at least two load bar engaging surfaces 121,123 of the second jaw body 110 is facing the load bar engaging surface 109 of the first jaw body 102.

FIG. 4C illustrates a minimum second configuration. A distance can be formed between the first jaw body 102 and the second jaw body 110. A distance D3 separates a load bar facing portion 108 of the first jaw body 102 from a second load bar facing portion 122 of the second jaw body 110. The load bar facing portion 108 of the first jaw body 102 can have a load bar engaging surface 109 as described above. In at least one embodiment, the load bar facing portion 108 can have a concave shape. In at least one embodiment, the load bar engaging surface 109 can have a concave shape.

The second jaw body 110 can have second load bar facing portion 122 that has a concave shape. The second load bar facing portion 122 can include a second load bar engaging surface 123 that can have a concave shape. Portions 122 and 123 can have other shapes.

The second jaw body 110 can have at least one lobe 116, 118 that extends obliquely away from a long axis 111 of the second jaw body 110. The at least one lobe 116, 118 can include a pivot connection 140, 141 between the respective connector 130, 131 and the second jaw body 110.

The connectors 130, 131 can include knob 162 which can be in the form of a graspable knob. The knob 162 can be coupled to an end of the connector 130 that can be coupled to first jaw body 102. In the illustrated example, the knob 162 is coupled to a male portion 172. When the knob 162 is rotated, the length of the respective connector 130, 131 can be lengthened. When the connectors 130, 131 are in their shortened configuration, the connectors can have a length 132. As the knob 162 is rotated, the length can be increased until the connectors 130, 131 reach a maximum length 133 as illustrated in FIG. 4D. In this second configuration of the convertible mounting bracket 100 the ends of the lobes 116, 118 will not touch the first jaw body 102.

In a maximum configuration as illustrated in FIG. 4D, the connectors 130, 131 can have a maximum length 133. When the connectors are in their maximum length configuration and the second jaw 110 is in its first configuration, the maximum distance between the load facing portion 108 of the first jaw body 102 and the first load facing portion 120 of the second jaw body 110 is a distance D4.

As illustrated the distance D2 is less than the distance D4. Additionally, the distance D1 is less than the distance D3. In at least one embodiment, the distance D3 can be less than the distance D2. The range of the distances between the load bar facing portion 108 of the first jaw body 102 and the first load bar facing portion 120 of the second jaw body 110 can have a portion of that range shared with the range of the distances between the load bar facing portion 108 of the first jaw body 102 and the second load bar facing portion 122 of the second jaw body 110.

The length of the connector can be adjustable such that a first distance between the first load bar facing portion 120 of the second jaw body 110 and the load bar facing portion 108 of the first jaw body 102 is adjustable over a first distance range, and the length of the connector 130 is adjustable such that a second distance between the second load bar facing portion 122 of the second jaw body 110 and the load bar facing portion of the first jaw body 102 is adjustable over a second distance range. The first and second distance ranges are different and the first distance range overlaps with the second distance range. A maximum adjustable distance of the first load bar facing portion 120 of the second jaw body 110 from the load bar facing portion 108 of the first jaw body 102 is greater than a maximum adjustable distance of the second load bar facing portion 122 of the second jaw body 110 from the load bar facing portion 108 of the first jaw body 102.

While the above distances and ranges have been described in relation to the load bar facing portions 108, 120, 122, similar descriptions apply to the load bar engaging surfaces 109, 121, 123 which are located on their respective load bar facing portions 108, 120, 122.

FIGS. 5-11 illustrate the ability of an exemplary convertible mounting bracket 100 in an installed configuration on a low profile load bar transitioning to an installed configuration on a high profile load bar. The convertible mounting bracket 100 can be configured to have a first configuration 152 to accommodate coupling to load bars having a height within a first range. Additionally, the convertible mounting bracket 100 can be configured to have a second configuration 154 to accommodate coupling to load bars having a height within a second range. In at least one implementation, the convertible mounting bracket 100, can be configured such that a portion of the first range and a portion of the second range overlap. The load bars can be secured to a vehicle by feet that are not illustrated in FIGS. 5-11 for clarity. While this specific example is provided with respect to connectors being pivotally coupled to the second jaw body 110, other types of connections that allow for the transition between the first configuration and the second configuration are considered within the scope of this disclosure. Furthermore, in at least one embodiment, the second jaw body 110 can move relative to the first jaw body 102 while transitioning between the first configuration and the second configuration thereby allowing the convertible mounting bracket 100 to remain at least partially assembled. When the convertible mounting bracket 100 remains at least partially assembled, the parts of the convertible mounting bracket 100 will not be lost and it saves time in transitioning the convertible mounting bracket 100 from a first configuration to a second configuration.

Figure 5:
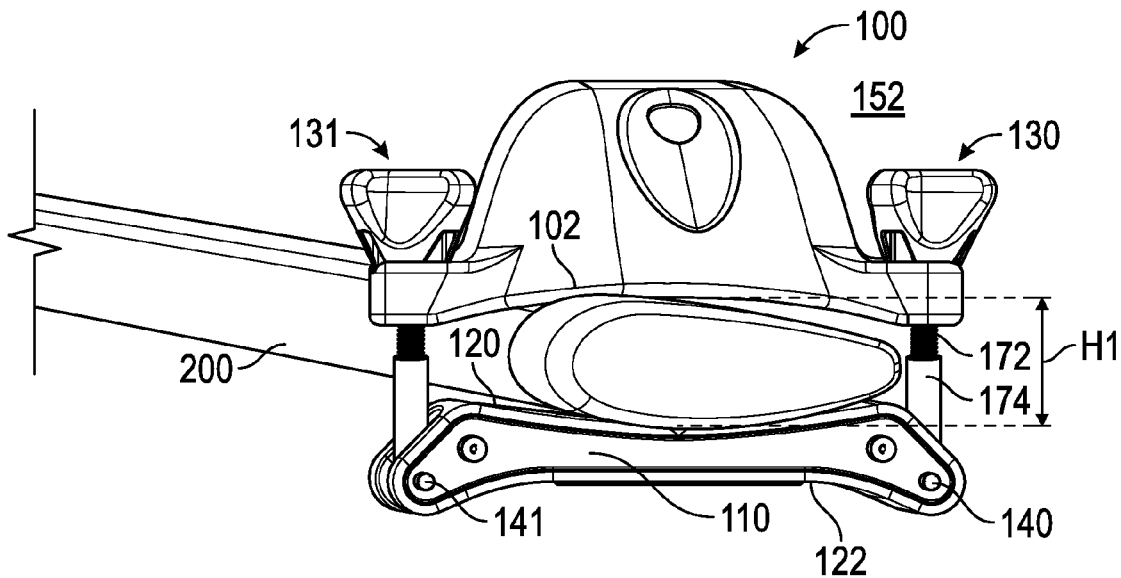
FIG. 5 is a perspective view of an exemplary convertible mounting bracket in an installed configuration on an exemplary low profile load bar according to an example embodiment.

FIG. 5 is a perspective view of an exemplary convertible mounting bracket 100 in an installed configuration on an exemplary low profile load bar 200 according to an example embodiment. The exemplary low profile load bar 200 can have an airfoil like shape to reduce drag. The low profile load bar 200 as illustrated can have a maximum thickness of H1. As illustrated the convertible mounting bracket 100 is coupled to the load bar 200 by clamping the load bar 200 between a first jaw body 102 and a second jaw body 110. The second jaw body 110 can have a first load bar facing portion 120 and a second load bar facing portion 122. In the first configuration 152 as illustrated in FIG. 5, the first load bar facing portion 120 faces the load bar 200. As described above with respect to FIGS. 4A-D, the connector 130 can be rotated with respect to the first jaw body 102 and second jaw body 110. The connector 130 can have a male portion 172 and a female portion 174 as described above. If the operator wishes to remove the convertible mounting bracket 100, the operator can lengthen the first connector or otherwise uncouple the first connector 130 from the first jaw body 102.

Figure 6:
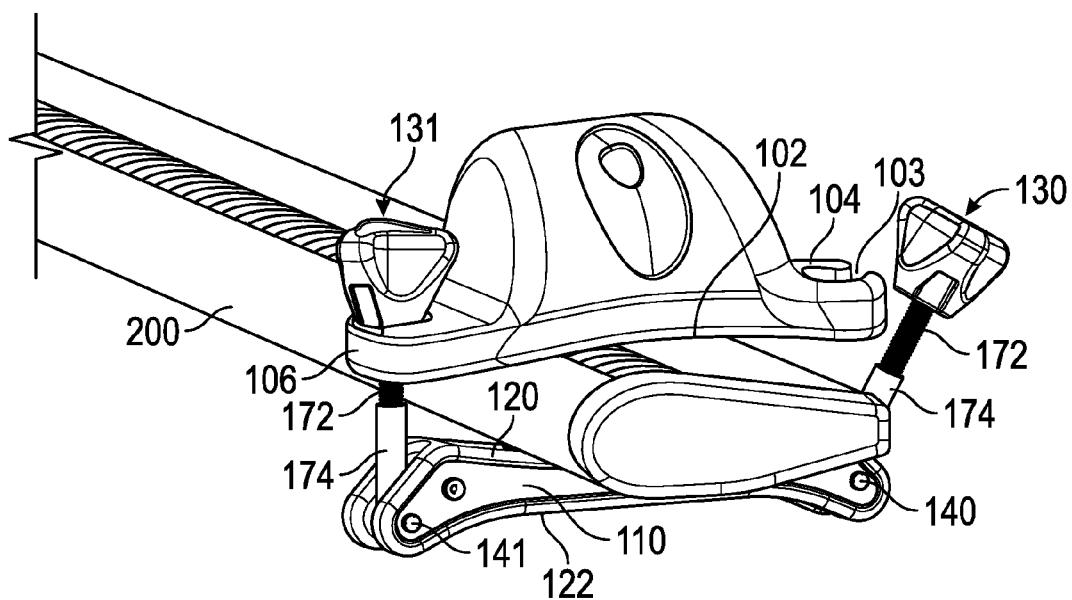
FIG. 6 is a perspective view of the exemplary convertible mounting bracket of FIG. 5 in a partially uninstalled configuration.

FIG. 6 is a perspective view of the exemplary convertible mounting bracket 100 of FIG. 5 in a partially uninstalled configuration in which the first connector 130 has been uncoupled from the first jaw body 102. The second connector 131 remains coupled to the first jaw body 102 and the second jaw body 110. The first connector 130 rotates about a pivot connection 140 and through a slot 103 formed in the first jaw body 103 at a first end 104. The second connector 131 can be coupled to the second jaw body 110 by a pivot connection 141. After the first connector 130 has passed through the slot 103, the second jaw body 110 can rotate about the pivot connection 141.

Figure 7:
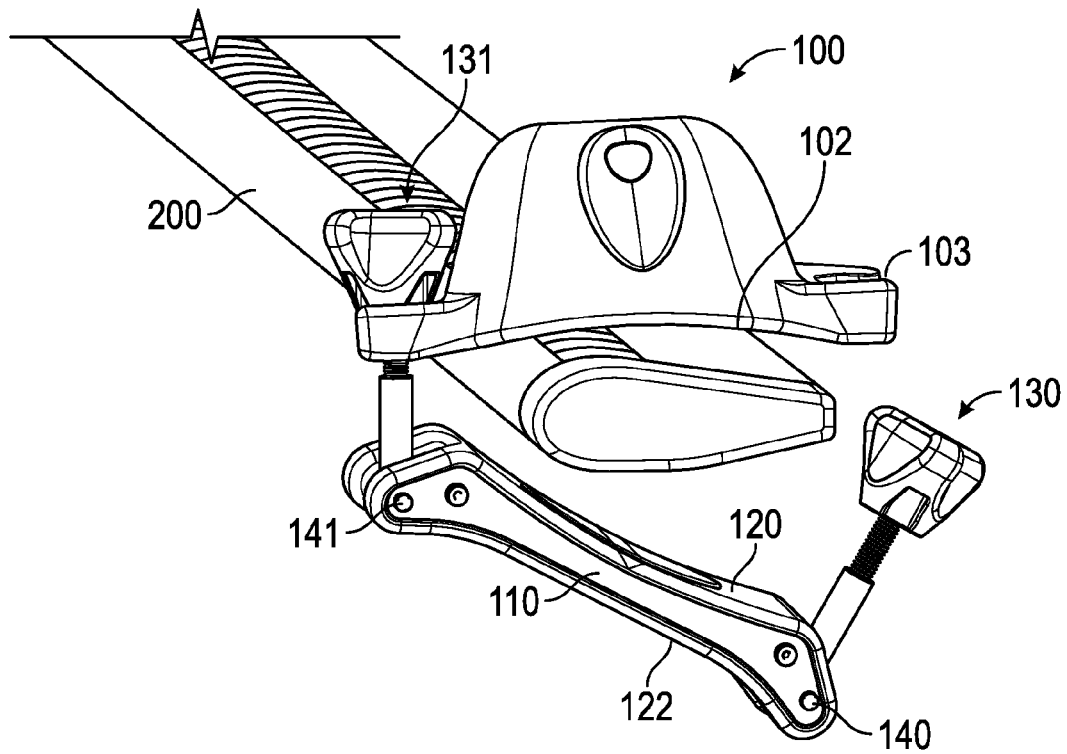
FIG. 7 is a perspective view of the exemplary convertible mounting bracket of FIG. 5 in another partially uninstalled configuration.
Figure 15:
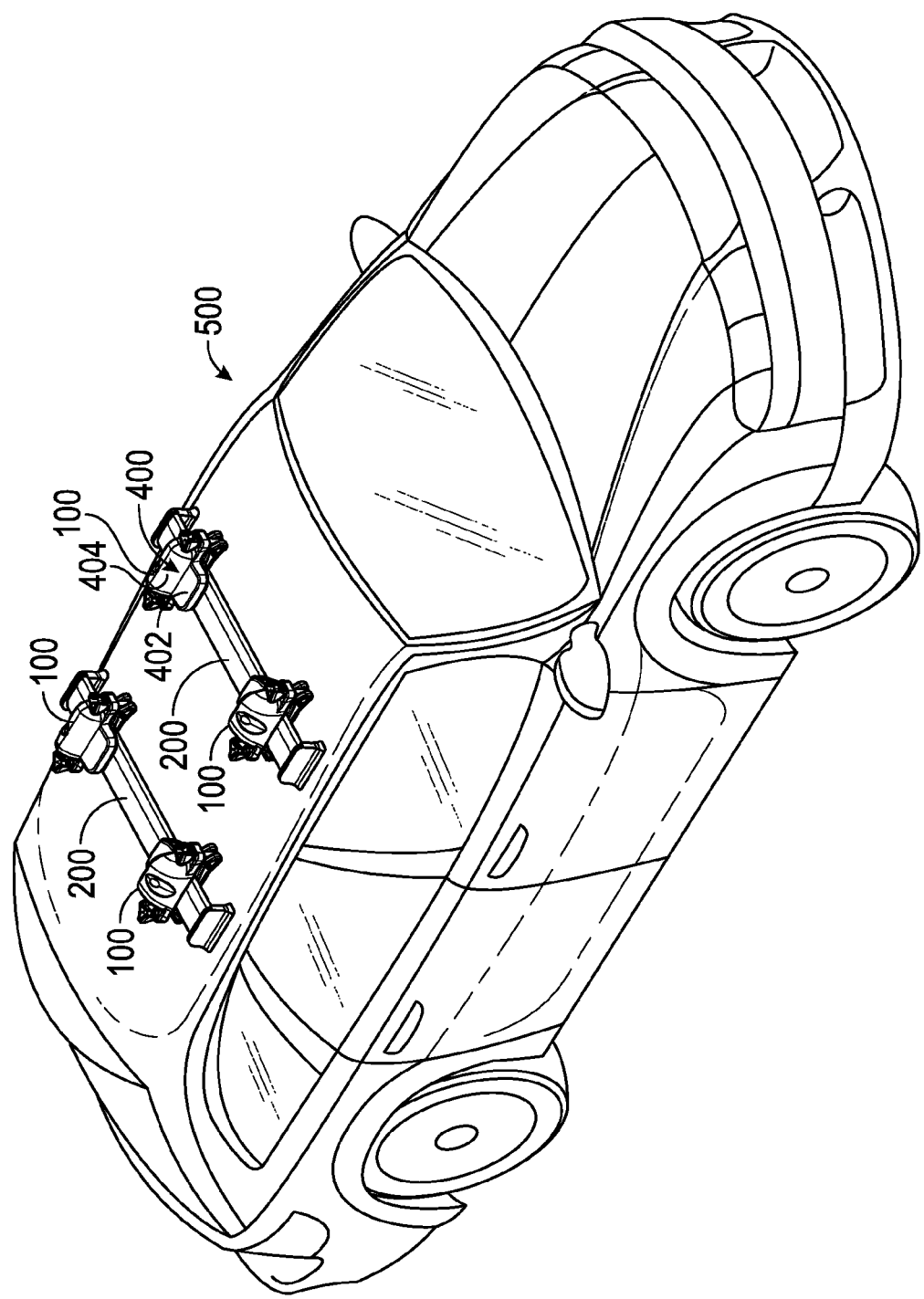
FIG. 15 is an example of a plurality of convertible mounting brackets in an installed configuration on a plurality of load bars.

FIG. 7 is a perspective view of the exemplary convertible mounting bracket 100 of FIG. 5 in another partially uninstalled configuration. As illustrated in FIG. 7, the first jaw body 102 is still positioned above the load bar 200 and the second jaw body 110 has been rotated with respect to the first jaw body 102. As shown, the second jaw body 110 can rotate about the pivot coupling 141 that couples the second connector 131 to the second jaw body 110. When the second jaw body 110 is rotated as illustrated, the convertible mounting bracket 100 can be removed from the load bar. The second connector can remain coupled to the first jaw body 102 so that the convertible mounting bracket 100 remains together as one functional unit even if the second jaw body 110 is free to rotate relative to the first jaw body 102. This allows for the convertible mounting bracket 100 to be installed on the portion of the load bar 200 that is located between the feet that couple the load bar to the vehicle or other mounting mechanism located on the vehicle. An example of such a configuration is illustrated in FIG. 15 and described herein.

Figure 8:
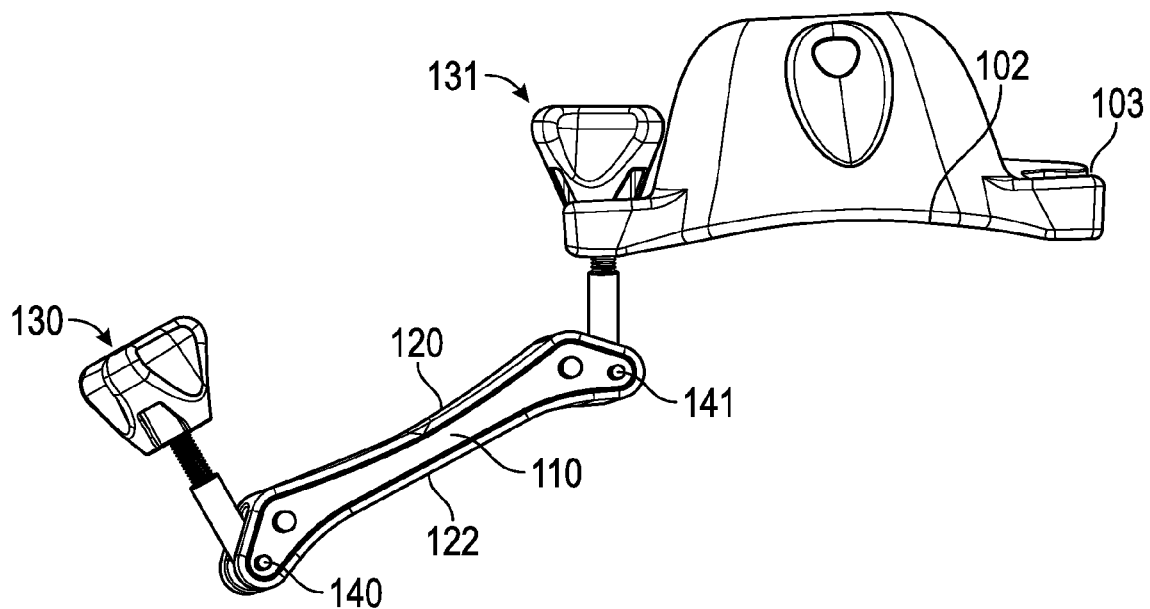
FIG. 8 is a perspective view of the exemplary convertible mounting bracket of FIG. 5 having a first jaw body and a second jaw body, in which the second jaw body is rotated relative to the first jaw body.

FIG. 8 is a perspective view of the exemplary convertible mounting bracket 100 having a first jaw body 102 and a second jaw body 110 of FIG. 5 in which the second jaw body is rotated relative to the first jaw body 102. The second jaw body 110 can rotate about the second connector 131 so that a substantial majority of the second jaw body is not located beneath the first jaw body 102. In this configuration, the second jaw body 110 can be further rotated with respect to the pivot connection 141.

Figure 9:
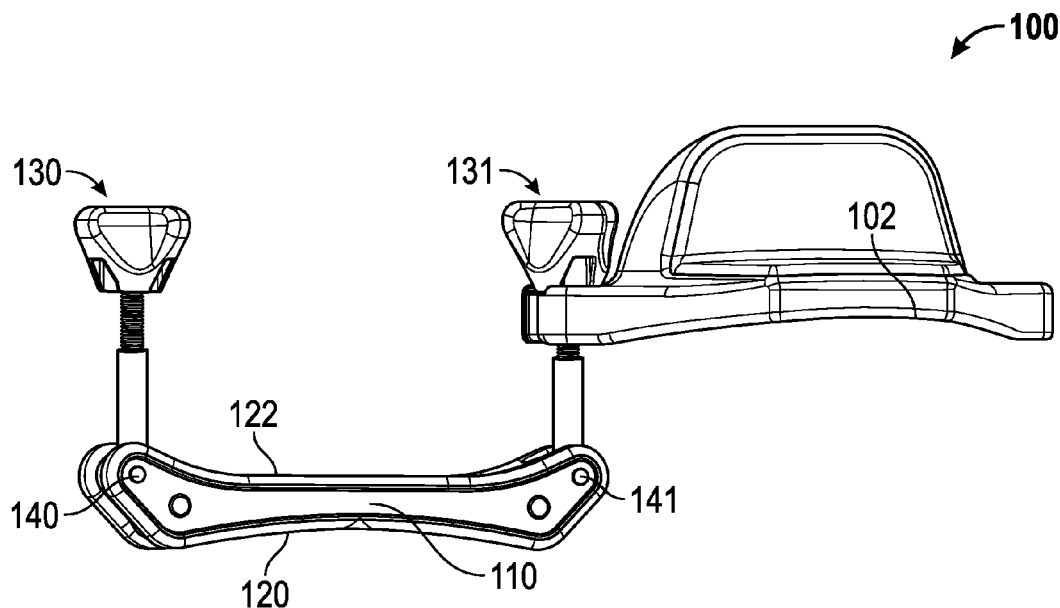
FIG. 9 is a perspective view of an exemplary convertible mounting bracket of FIG. 5 having a first jaw body and a second jaw body in which the second jaw body is rotated and inverted relative to the position of the first jaw body.

FIG. 9 is a perspective view of an exemplary convertible mounting bracket 100 having a first jaw body 102 and a second jaw body 110, in which the second jaw body 110 is rotated and is inverted relative to the position of the first jaw body 102. In this configuration, the second jaw body 110 is in the second configuration relative to the first jaw body 102. The second jaw body 110 can be rotated relative to the first jaw body 102 such that it can be placed around a load bar having a different height.

Figure 10:
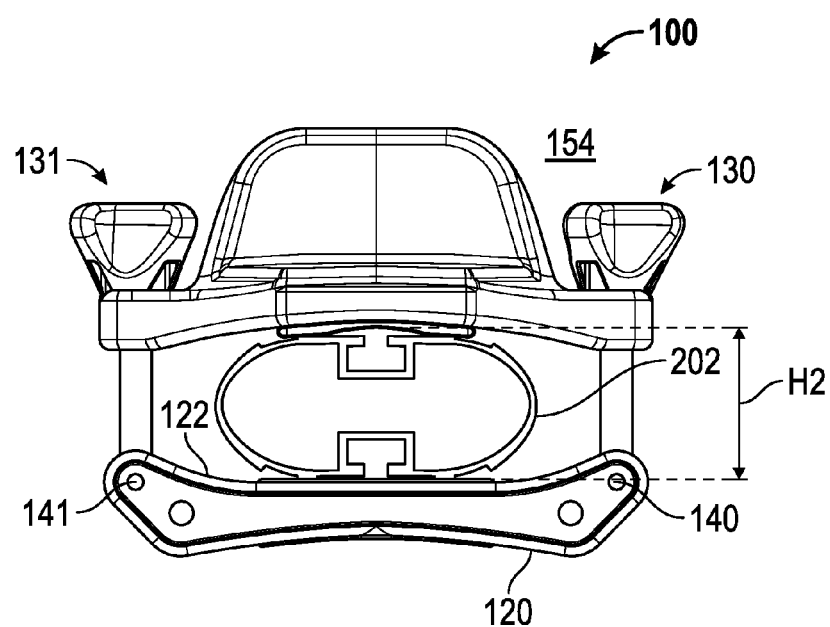
FIG. 10 is an elevation view of an exemplary convertible mounting bracket in an installed configuration on an exemplary high profile load bar according to an example embodiment.

FIG. 10 is an elevation view of an exemplary convertible mounting bracket 100 in an installed configuration on an exemplary high profile load bar 202 according to an example embodiment. As illustrated the load bar 202 can have a height H2. The height H2 of load bar 202 can be greater than the height H1 of load bar 200 as illustrated in FIG. 5. Thus, in this second configuration 154 of the convertible mounting bracket 100, the convertible mounting bracket 100 can be configured to engage a load bar 202 having a dimension that could not be accommodated in the first configuration as illustrated with respect to FIG. 5. Thus, the convertible mounting bracket 100 can accommodate a first range of heights of load bars in a first configuration and a second range of heights of load bars in a second configuration.

Figure 11:
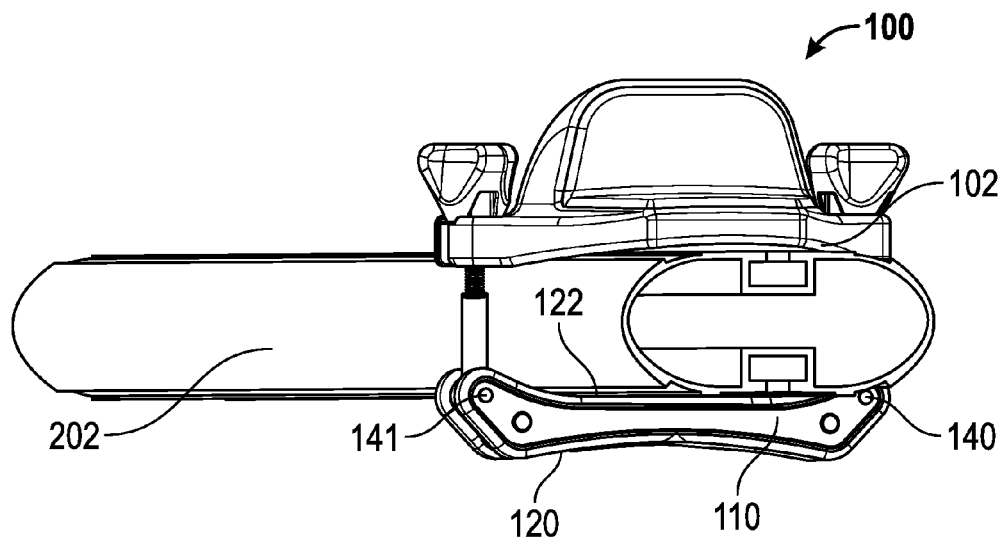
FIG. 11 is a perspective view of an exemplary convertible mounting bracket in an installed configuration on the exemplary high profile load bar of FIG. 10.

FIG. 11 is a perspective view of the exemplary convertible mounting bracket 100 in an installed configuration on an exemplary high profile load bar 202. As illustrated, the high profile load bar 202 is clamped between a first jaw body 102 and a second jaw body 110. As illustrated, the second jaw body 110 has a second load bar facing portion 122 that faces the load bar 202. In this second configuration, the distance between the second jaw body 110 from the first jaw body 102 is increased relative to the distance between the second jaw body 110 from the first jaw body 102 when the first connector 130 and second connector 131 are the same relative length.

Figure 12:
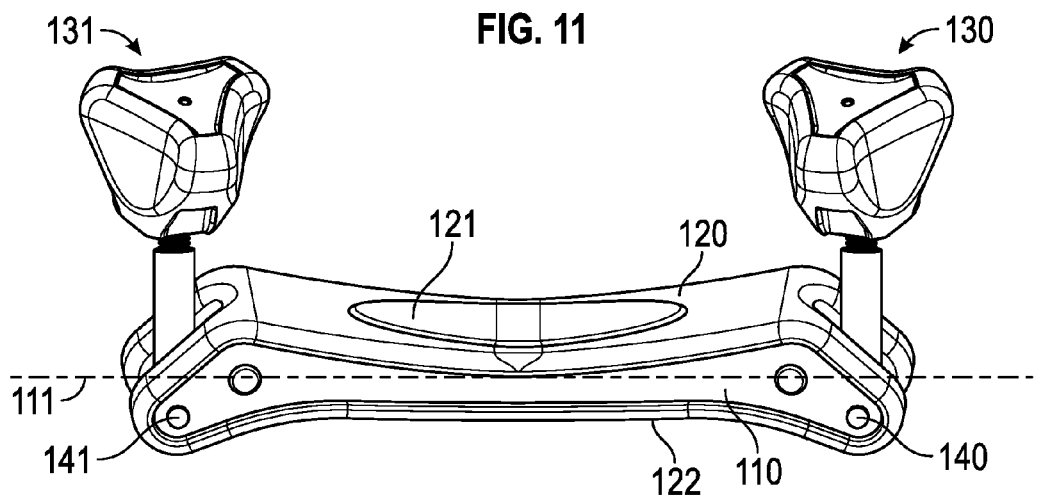
FIG. 12 is a perspective view of a second jaw of an exemplary convertible mounting bracket in which a first load bar engaging surface is seen in an example embodiment.

FIG. 12 is a perspective view of a second jaw 110 of an exemplary convertible mounting bracket 100 in which a first load bar engaging surface 121 is seen. The first load bar engaging surface 121 is located on the first load bar facing portion 120. The first load bar facing portion 120 faces the load bar in a first configuration. The first load bar engaging surface 121 can be coupled to the first load bar facing portion 120. In one embodiment, the first load bar engaging surface 121 can be co-molded with the first load bar facing surface. Additionally, in another embodiment, the first load bar engaging surface 121 can be co-molded with the second jaw body 110. In yet another embodiment, the first load bar engaging surface 121 can be removable from the first load bar facing portion 120 such that it can be replaced when worn or damaged.

Figure 13A:
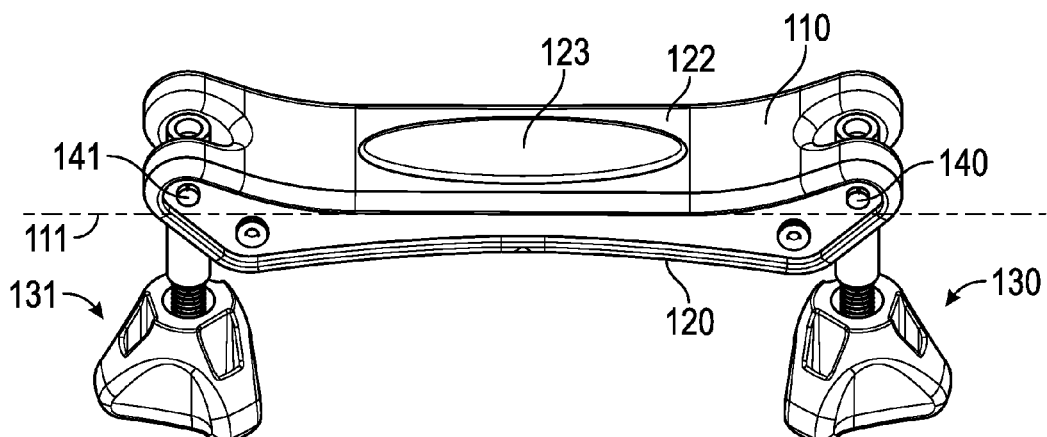
FIG. 13A is another perspective view of a second jaw of an exemplary convertible mounting bracket in which a second load bar engaging surface is seen and flip-connectors are in a first position in an example embodiment.

FIG. 13A is another perspective view of a second jaw 110 of an exemplary convertible mounting bracket 100 in which a second load bar engaging surface 123 is seen and connectors 130, 131 are in a first position in an example embodiment. The second load bar engaging surface 123 is located on the second load bar facing portion 122. The second load bar facing portion 122 faces the load bar in a first configuration. The second load bar engaging surface 123 can be coupled to the second load bar facing portion 122. In one embodiment, the second load bar engaging surface 123 can be co-molded with the first load bar facing surface. Additionally, in another embodiment, the second load bar engaging surface 123 can be co-molded with the second jaw body 110. In yet another embodiment, the second load bar engaging surface 123 can be removable from the second load bar facing portion 122 such that it can be replaced when worn or damaged.

FIG. 13B is another perspective view of a second jaw 110 of an exemplary convertible mounting bracket 100 in which a second load bar engaging surface 123 is seen and connectors 130, 131 are in a second position in an example embodiment. The first connector 130 is rotated relative to the second jaw body 110 about a pivot connection 140. The second connector 131 is rotated relative to the second jaw body 110 about a pivot connection 141. The second jaw body 110 has long axis 111.

FIG. 13C is another perspective view of a second jaw 110 of an exemplary convertible mounting bracket 100 in which a second load bar engaging surface 123 is seen and connectors 130, 131 are in a third position in an example embodiment. The first connector 130 is rotated relative to the second jaw body 110 about a pivot connection 140. The second connector 131 is rotated relative to the second jaw body 110 about a pivot connection 141. The second jaw body 110 has long axis 111.

Figure 14:
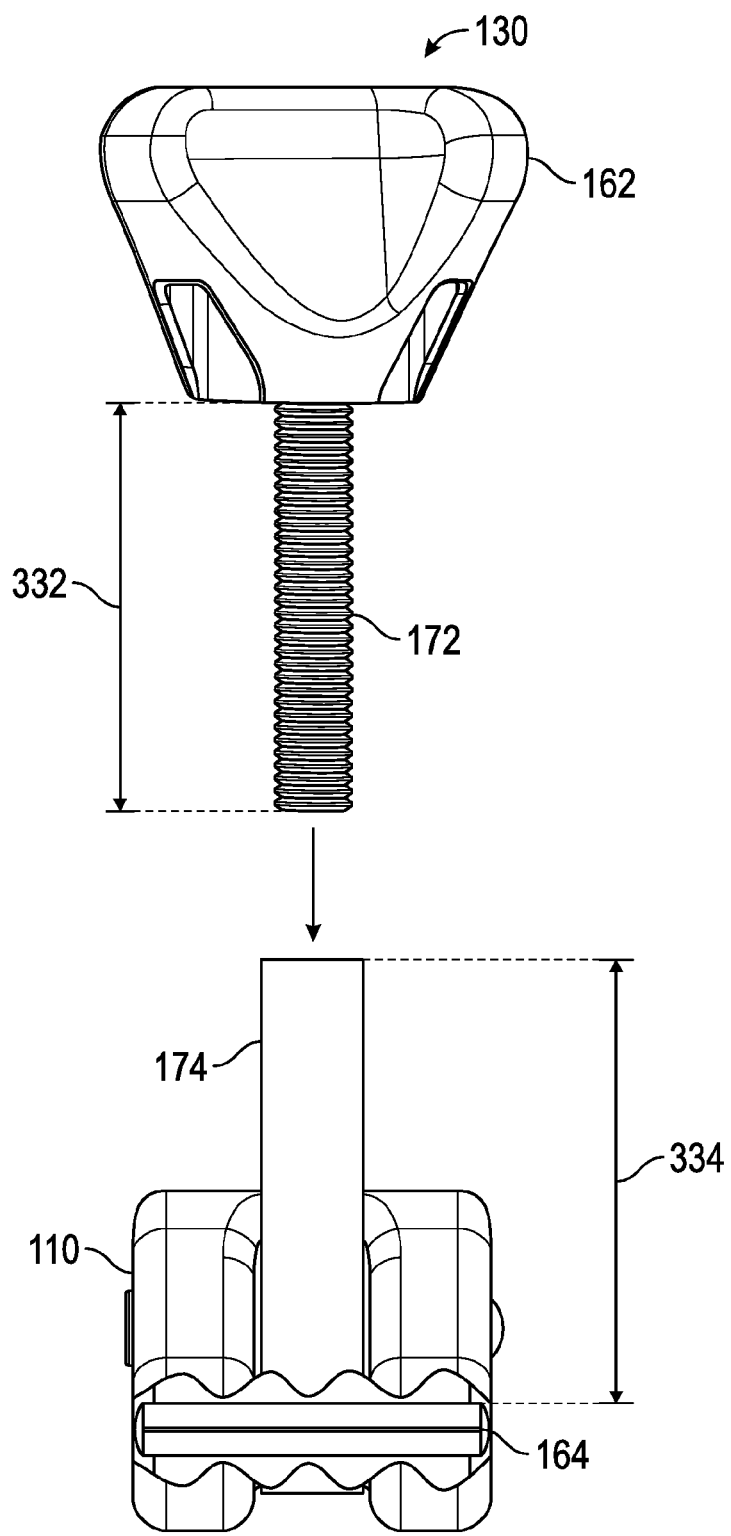
FIG. 14 is an example of a flip-connector according to the present disclosure.

FIG. 14 is an example of a connector 130 according to the present disclosure. The connector 130 can include a male portion 172 and a female portion 174. The female portion can include a hollow portion configured to receive the male portion. The male portion 172 can be at least partially threaded. In other embodiments, the male portion can be completely threaded. When the male portion 172 is threaded at least a portion of the female portion 174 can be threaded. In at least one embodiment, the female portion 174 can be completely threaded. In another embodiment, the female portion 174 can be threaded until it reaches a predetermined length. The female portion can have a hole formed cross-wise to the hollow portion of the female portion 174. The hole formed cross-wise can be configured to receive a pin 164 that couples the female portion 174 to the second jaw portion 110. The pin 164 allows the female portion 174 to rotate relative to the second jaw body 110. In other embodiments, other coupling connections can be implemented to allow the female portion to rotate relative to the second jaw body 110.

The male portion 172 can have a length 332 and be coupled to a knob 162. The knob 162 can be constructed to allow for the proper amount of torque to be applied to the threads of the male portion 172. The length 332 of the male portion can be substantially the same length as a length 334 of the female portion 174 above the pin 164. For example, the length 332 of the male portion 172 can be just less than the length 334 of the female portion 174 above the pin 164. In this arrangement, the male portion 172 will not contact the pin 164. The thread size of the male portion 172 and female portion 174 can be based upon the diameter of the male portion 172 and the desired holding force.

While the embodiment illustrated in FIG. 14 includes a threaded male portion 172 and a threaded female portion 174, other embodiments can implement other male portions 172 and other female portions. For example, the male portion 172 can be coupled to the female portion by a pin connection. Additionally, the male portion 172 and female portion 174 can be inverted in relation to one another such that knob 162 is located on the female portion 174 and the second jaw 110 is coupled to the male portion. In other implementations, the connector 130 can include other types of coupling devices such that a portion of the connector 130 can be removable coupled to the second jaw body 110.

FIG. 15 is an example of a plurality of convertible mounting brackets 100 in an installed configuration on a plurality of load bars 200. As illustrated, the vehicle 500 has two load bars 200 coupled thereto. The two load bars 200 are transverse to the direction of the motion of the vehicle 500. As illustrated the two load bars 200 each have two convertible mounting brackets 100 installed thereon. The convertible mounting brackets 100 can include sport equipment engagement portions as described above such that a canoe or kayak can be configured to be mounted therebetween. As indicated above, the convertible mounting brackets 100 can be configured to couple to other types of sports equipment.

Figure 16:
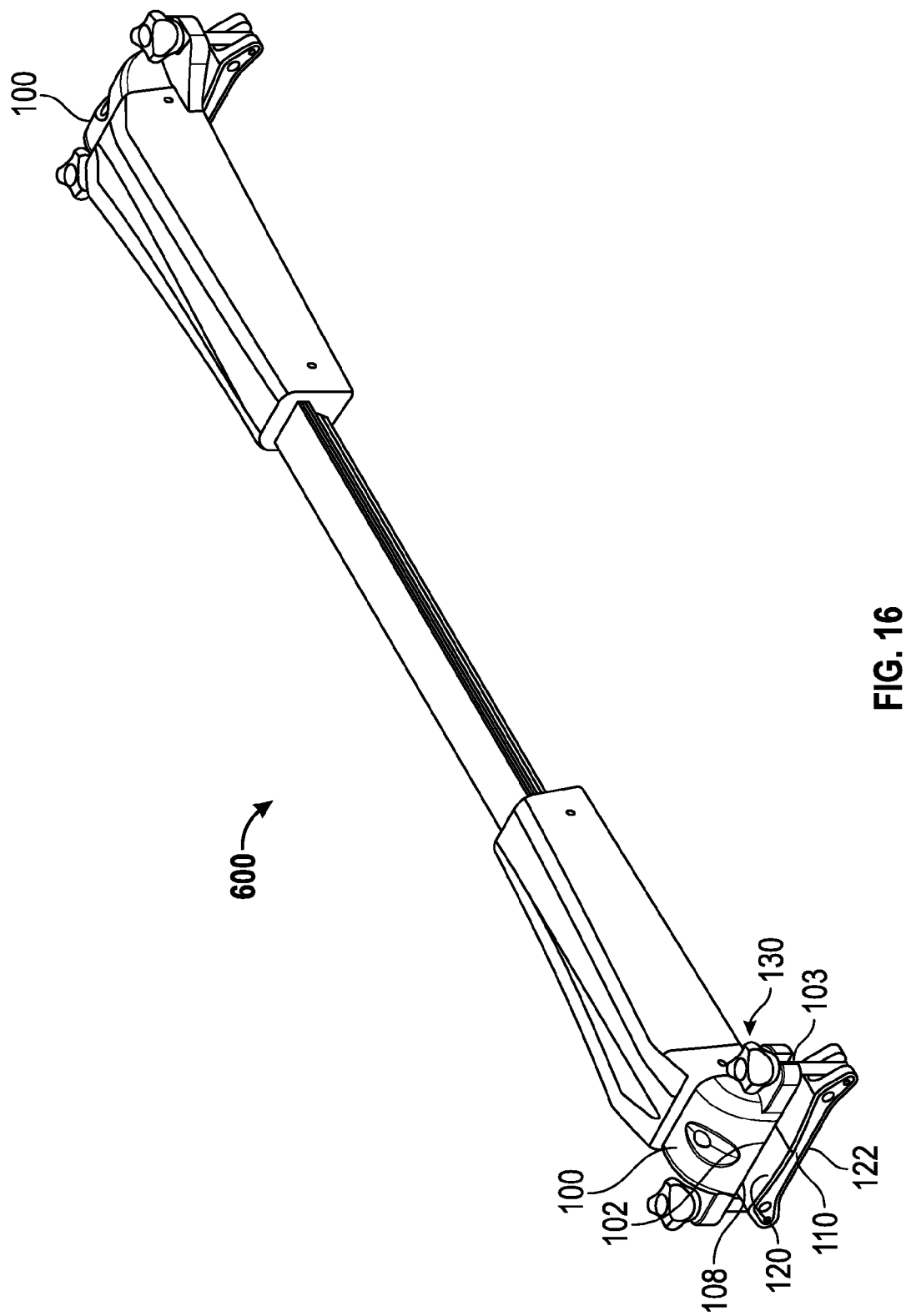
FIG. 16 is an example of a sport equipment carrier in the form of kayak/canoe carrier having convertible mounting brackets according to an example embodiment.

FIG. 16 is an example of a sport equipment carrier 600 in the form of kayak/canoe carrier having convertible mounting brackets 100 according to an example embodiment. As illustrated the sport equipment carrier 600 is configured to be expanded to allow for a variety of different sizes of kayaks or canoes to be placed thereon. The sport equipment carrier 600 includes two convertible mounting brackets 100 coupled thereto. The convertible mounting brackets 100 can be removably coupled to the sport equipment carrier 600. In other implementations, the first jaw body 102 of the convertible mounting bracket 100 can be integrally molded with a portion of the of the sport equipment carrier 600.

The convertible mounting bracket 100 can be configured to receive and couple to a load bar (not shown) between a first jaw body 102 and a second jaw body 110. The second jaw body 110 can include a first load bar facing portion and a second load bar facing portion. As described above, the convertible mounting bracket 100 can include a first jaw body having a slot 103 formed therein to allow a connector 130 to rotate with respect to a second jaw body 110. The second jaw body 110 can remain coupled to the first jaw body even when the connector is disengaged from the first jaw body 102 and rotated. Thus, the sports equipment carrier 600 can be used with load carrier bars of different dimensions as indicated above.

While the illustrated example of the sport equipment carrier 600 is in the form of a kayak/canoe carrier, the convertible mounting bracket 100 can be implemented with other sport equipment carriers such as carriers configured to transport bicycles, skis, cargo containers and other objects to be placed on a roof of a vehicle.

Example implementations have been described hereinabove regarding various example embodiments. The example embodiments are intended to constitute non-limiting examples. The subject matter that is intended to be within this disclosure is set forth in the following claims.

The invention claimed is:

1. A convertible mounting bracket capable of securement onto load carrier bars of different dimensions, the bracket comprising:
   an elongate first jaw body having a first end opposite a second end;
   the first jaw body having a load bar engaging surface;
   an elongate second jaw body having a first end opposite a second end;
   the second jaw body having at least two load bar engaging surfaces on opposite sides of the second jaw body and
   a flip-connector coupled between the first ends of each of the first and second jaw bodies;
   the flip-connector being interconnected to the first end of the second jaw body by a pivot connection, the pivot connection accommodating approximately 180 degree pivotation of the second jaw body about the pivot connection between first and second orientations of the second jaw body and
   wherein, in the first orientation of the second jaw body a first of the at least two load bar engaging surfaces of the second jaw body is facing the load bar engaging surface of the first jaw body and in the second orientation of the second jaw body a second of the at least two load bar engaging surfaces of the second jaw body is facing the load bar engaging surface of the first jaw body and thereby accommodating securement of the convertible mounting bracket onto load carrier bars of different dimensions.

2. The convertible mounting bracket of claim 1, wherein the first engaging surface of the second jaw body is closer in distance to the load bar engaging surface of the first jaw body in the first orientation than the second engaging surface in the second orientation when the flip-connector is the same length in each orientation.

3. The convertible mounting bracket of claim 1, wherein the first and second engaging surfaces of the second jaw body are each concave into the second jaw body.

4. The convertible mounting bracket of claim 1, wherein the second jaw body has at least one lobe extending obliquely away from a long axis of the second jaw body the at least one lobe comprising the pivot connection between the flip-connector and the second jaw body.

5. The convertible mounting bracket of claim 1, wherein the first jaw body contains a slot into the first end for laterally receiving the flip-connector therein.

6. The convertible mounting bracket of claim 1, further comprising:
a second flip-connector coupled between the second ends of each of the first and second jaw bodies; and
the second flip-connector being connected by a pivot connection to the second end of the second jaw body.

7. The convertible mounting bracket of claim 6, wherein during transition from the first orientation to the second orientation, one of the flip-connectors remains connected to the first and second jaw bodies.

8. The convertible mounting bracket of claim 1, wherein the flip-connector comprises a graspable knob attached to an end of the flip-connector that is coupled to the first jaw body.

9. The convertible mounting bracket of claim 8, wherein rotation of the knob reduces an effective length of the flip-connector.

10. The convertible mounting bracket of claim 1, wherein the flip-connector comprises an elongate shaft.

11. The convertible mounting bracket of claim 1, wherein a length of the flip-connector is adjustable.

12. The convertible mounting bracket of claim 11, wherein the flip-connector comprises a pair of telescoping members that upon actuation vary the length of the flip-connector.

13. The convertible mounting bracket of claim 12, wherein the telescoping members of the flip-connector comprise a male member threadable into a female member.

14. The convertible mounting bracket of claim 11, wherein the length of the flip-connector is adjustable such that a first distance between the first load bar engaging surface of the second jaw body and the load bar engaging surface of the first jaw body is adjustable over a first distance range, and the length of the flip-connector is adjustable such that a second distance between the second load bar engaging surface of the second jaw body and the load bar engaging surface of the first jaw body is adjustable over a second distance range.

15. The convertible mounting bracket of claim 14, wherein the first and second distance ranges are different and the first distance range overlaps with the second distance range.

16. The convertible mounting bracket of claim 14, wherein a maximum adjustable distance of the first load bar engaging surface of the second jaw body from the load bar engaging surface of the first jaw body is greater than a maximum adjustable distance of the second load bar engaging surface of the second jaw body from the load bar engaging surface of the first jaw body.

17. A convertible mounting bracket capable of securement onto load carrier bars of different dimensions, the bracket comprising:
an elongate first jaw body having a first end opposite a second end;
the first jaw body having a load bar facing portion;
an elongate second jaw body having a first end opposite a second end;
the second jaw body having at least two load bar facing portions on opposite sides of the second jaw body; and
a connector couplable between the first ends of each of the first and second jaw bodies, wherein the connector accommodates inverted reconfiguration of the second jaw body between a first orientation in which a first of the at least two load bar facing portions of the second jaw body is facing the load bar facing portion of the first jaw body and a second orientation in which a second of the at least two load bar facing portions of the second jaw body is facing the load bar facing portion of the first jaw body and thereby accommodates securement of the convertible mounting bracket onto load carrier bars of different dimensions.

18. A sporting equipment load carrier, comprising:
a first jaw body and a second jaw body for receiving a vehicular mounted load carrier bar therebetween, wherein a surface of one of the first or second jaw bodies is adapted to abuttingly engage the load carrier bar;
a first elongate fastener attachable between first ends of the first and second jaw bodies, wherein the first fastener comprises a male portion and a female portion, the male portion insertable at variable lengths into the female portion, wherein the female portion is connected by a pivot connection to the first end of the second jaw body, and wherein the first end of the first jaw body comprises a slot configured to receive the first fastener therein; and
a second elongate fastener attachable between second ends of the first and second jaw bodies, wherein the second fastener comprises a male portion and a female portion, the male portion insertable at variable lengths into the female portion.

19. The sporting equipment load carrier of claim 18, wherein the fastener comprises a graspable knob attached to an end of the fastener that is coupled to the first jaw body.

20. The sporting equipment load carrier of claim 19, wherein rotation of the knob reduces the effective length of the fastener.

21. The sporting equipment load carrier of claim 18, wherein the knob comprises a smooth outer surface.

22. The sporting equipment load carrier of claim 21, wherein one of the first or second jaw bodies comprises a slot to receive the male portion of the fastener and a top surface for abutment of the knob thereon when the male portion is received in the slot.

23. The sporting equipment load carrier of claim 18, wherein the male portion is threadably insertable into the female portion.

24. The sporting equipment load carrier of claim 18, wherein the female portion is hollowed along a portion of its length, the hollowed portion configured to receive the male portion.

25. The sporting equipment load carrier of claim 18, wherein the female portion is pivotably attached to the bracket.

26. The convertible mounting bracket of claim 1, wherein the elongate first jaw body is fixedly attached to a load carrier.

27. The convertible mounting bracket of claim 1, wherein the elongate first jaw body is formed as an integral portion of a load carrier.

28. The convertible mounting bracket of claim 17, further comprising an engagement member configured to be positioned upon at least one of the load bar facing portions of the second jaw body wherein the engagement member has an exposed surface adapted to engage a load carrier bar in an installed configuration of the convertible mounting bracket on a load carrier bar.

29. The convertible mounting bracket of claim 17, further comprising a plurality of exchangeable engagement members, each engagement member configured to be positioned upon at least one of the load bar facing portions of the second jaw body wherein different engagement members are adapted to engage differently dimensioned load carrier bars.

30. The sporting equipment load carrier of claim 18, wherein the female portion is connected by a pivot connection to the second end of the second jaw body.

\* \* \* \* \*